2,887,476
Patented May 19, 1959

2,887,476
METAL-CONTAINING POLYAZO DYESTUFFS

Horst Nickel, Koln-Stammheim, and Fritz Suckfüll, Leverkusen, Germany, assignors to Farbenfabriken Bayer Aktiengesellschaft, Leverkusen, Germany, a corporation of Germany No Drawing. Application December 19, 1957
Serial No. 703,737

Claims priority, application Germany December 21, 1956

2 Claims. (Cl. 260—145)

The present invention relates to new metal-containing polyazo dyestuffs and to a process for their manufacture; more particularly it relates to metal-containing polyazo dyestuffs corresponding to the formula

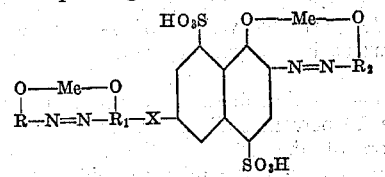

In this formula R and $R_2$ mean the same or different radicals of a coupling component wherein the complex-linked oxygen atom stands in o-position to the azo bridge, Me stands for a bivalent metal atom, preferably a copper atom, $R_1$ means an aromatic radical in which the azo bridge and the radical X are in the p-position to one another and the complex-linked oxygen atom stands in o-position to the final azo bridge, and X means a bridge member containing at least 2 nitrogen atoms, for example an azo, azoxy, or NH—Y—NH-group wherein Y represents the radical of a bi-functional acylating agent.

The new metal-containing polyazo dyestuffs are obtainable by combining diazotized 2-amino-6-nitronaphthalene-4,8-disulfonic acid with azo components coupling in the o-position to a hydroxyl group, by oxidizing coppering of the azo dyestuffs thus obtained, by reducing the nitro group in these dyestuffs to form the amino group, by further diazotizing and coupling with o-alkoxy-amino compounds of the benzene or naphthalene series in the p-position to the amino group, further diazotizing, combining the aminoazo compounds thus obtained with azo components coupling in the o-position to a hydroxyl group, and by treating the polyazo dyestuffs thus obtained with metallizing agents.

Dyestuffs of the same structure are obtainable by using, instead of 2-amino-6-nitronaphthalene-4,8-disulfonic acid, 2-amino-6-acylaminonaphthalene-4,8-disulfonic acid and by effecting the conversion of the acylamino group into the free amino group in usual manner, for example by heating the acylaminoazo compound with a dilute sodium hydroxide solution.

The same or similar dyestuffs are obtainable by combining diazotized 2-amino-6-nitronaphthalene-4,8-disulfonic acid with an azo component coupling in the o-position to a hydroxyl group, by oxidizing coppering of the azo dyestuff thus obtained, and by linking the copper-containing nitroazo compound to a metal-containing nitroazo compound, which is obtained by metallisation of a monoazo dyestuff from an aromatic o-alkoxy-diazo compound and an azo component coupling in the o-position to a hydroxyl group, with conversion of the nitro groups into a bridge member containing at least 2 nitrogen atoms.

The particular symmetry with regard to the N- and S-containing substituents in the molecule of 2-amino-6-nitronaphthalene-4,8-disulfonic acid enables the new dyestuffs to be produced also by methods other than those described above. It is for example possible first to build up the central body of the formula

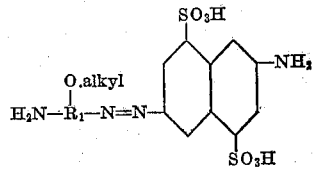

by coupling diazotized 2-amino-6-nitronaphthalene-4,8-disulfonic acid with aromatic o-alkoxyamines in the p-position to the amino group with subsequent reduction of the nitro groups. The tetrazotized diamino compound can then be combined with similar or different coupling components coupling in the o-position to a hydroxyl group, and the polyazo dyestuff thus formed finally be metallized, preferably coppered with oxidation and dealkylation.

Another method of producing the azo dyestuffs consists in coupling diazotized 2-amino-6-nitronaphthalene-4,8-disulfonic acid with aromatic o-alkoxyamino compounds in the p-position to the amino group, in further diazotizing, coupling with an azo component in the o-position to a hydroxyl group, reducing the nitroazo dyestuff thus obtained, diazotizing and coupling with another azo component in the o-position to a hydroxy group and subsequently effecting the metal complex formation. The de-alkylating metallization may in this case also be carried out already in the last stage but one, i.e. before the final coupling.

The dyestuffs to be produced with a linkage of two molecules can also be built up in such a manner that, for example, the two nitroazo compounds are first used in the metal-free form, possibly with a previous de-coppering of the nitro-azo compound coppered by oxidation, and in that a de-alkylating and, if desired, oxidizing metallization is effected in the final stage of the process. Likewise the de-alkylating or oxidizing coppering may also be used as the only final method of metallization, if only one of the two nitroazo dyestuffs is used as metal complex compound.

The conversion of the nitro group of the copper-containing nitroazo compounds into the amino group is effected in known manner, for examples with sodium sulfide; the oxidizing coppering is expediently carried out according to the processes of German patent specifications Nos. 807,289 or 889,196.

The linkage of two molecules of the same or different azo dyestuffs which contain nitro groups and may be present in the form of their metal complex compounds is carried out, for example, by alkaline reduction with glucose. In this case an azo or azoxy group is formed as a bridge member containing at least two nitrogen atoms. The dyestuff molecules can also be linked with one another in such a manner that first the nitro groups are reduced to amino groups and that subsequently 2 mols of dyestuffs containing amino groups are reacted according to known methods with bifunctional acylating agents, for example, phosgen, cyanuric chloride or fumaric acid di-chloride. In the case where metal complex compounds of the employed dyestuffs containing nitro groups are used, there occurs sometimes an at least partial demetallization. An after-treatment of the dyestuffs obtained in the final stage, i.e. after the linkage, with metallizing agents is therefore often desirable.

Coupling components R and $R_2$ in the end-position which are suitable for carrying out the process of the invention are for example: 1-hydroxy-4-methylbenzene, 2-hydroxynaphthalene, 2-hydroxynaphthalene-4, -5, -6, -7- or 8-monosulfonic acid, 2-hydroxynaphthalene-3,6-disulfonic acid, 1-hydroxynaphthalene-4-sulfonic acid, 1-hydroxynaphthalene-3,6- or 3,8-disulfonic acid, 1-hydroxynaphthalene-3,6,8-trisulfonic acid, 1-hydroxy-8-ethoxynaphthalene-3,6-disulfonic acid, 2-acetylamino-5-hydroxynaphthalene-7-sulfonic acid, 1-phenyl-3-methyl-5-pyrazolone, 1-(4',8'-disulfonaphthyl-2'-)-3-methyl - 5 - pyrazolone.

As suitable aromatic o-alkoxyamino compounds there may be mentioned for example: 1-amino-2-methoxybenzene, 1-amino-2-methoxy-5-methylbenzene, 1-amino-2,5-dimethoxybenzene, 1-amino-2-methoxynaphthalene-6-sulfonic acid, 1-amino-2-ethoxynaphthalene-6-sulfonic acid.

Depending on the process applied, the polyazo dyestuffs may be present before the final coppering in the metal-free or in a partially metallized form. It is advantageous to after-treat them in substance or on the fibre with metallizing, particularly copper-yielding, agents. The dyestuffs metallized in substance preferably contain approximately 2 metal atoms per dyestuff molecule which may be exchanged for other metal atoms by usual methods of de-metallization and re-formation of metal complexes.

Among the metal complex compounds, the copper-containing dyestuffs are of particular importance. Valuable dyestuffs are, however, also obtained when using chromium-, cobalt- or nickel-yielding agents as metallizing agents.

The dyestuffs metallized in substance are excellently suitable for dyeing vegetable fibres such as cotton, dyeings of valuable properties being thus obtained.

The following examples are given for the purpose of illustrating the invention without, however, limiting it thereto; the parts by weight and the parts by volume stand in the ratio of grams to millilitres.

*Example 1*

30.4 parts by weight (0.1 mol) of the sodium salt of 2-hydroxynaphthalene-3,6-disulfonic acid are dissolved in 300 parts by volume of water and treated with 180 parts by volume of a 20 percent sodium carbonate solution. This solution is combined at 0–5° C. with a diazonium salt solution obtained in usual manner from 34.8 parts by weight of 2-amino-6-nitronaphthalene-4,8-disulfonic acid. When the coupling is completed, the monoazo dyestuff thus formed is salted out with sodium chloride and isolated.

The dyestuff paste thus obtained is dissolved in 1000 parts by volume of water, treated with 140 parts by volume of a 20 percent sodium acetate solution and rendered weakly acid (pH about 5.5) with acetic acid. After the addition of a solution of 25 parts by weight of crystallized copper sulfate in 140 parts by volume of water, 280 parts by volume of 3 percent hydrogen peroxide are added dropwise with stirring at 55–60° C. within about 3 hours, and the solution is after-stirred for 1 hour. After the addition of hydrogen peroxide is terminated, the shade of the solution has changed to bluish violet. The monoazo dyestuff thus coppered by oxidation is separated with sodium chloride and isolated.

The dyestuff paste thus obtained is stirred in 1000 parts by volume of water, rendered weakly soda-alkaline, heated to 55° C. and treated with a solution of 50 parts by weight of crystallized sodium sulfide in 100 parts by volume of water having a temperature of 55° C., the temperature rising thereby to about 60° C. The reaction mixture is kept at a temperature of 55–60° C., until the reduction is terminated. The product is then filtered off with suction, the filtrate acidified and the reaction product salted out with sodium chloride. The product thus obtained which may be purified by re-crystallization presumably corresponds in the free acid state to the formula

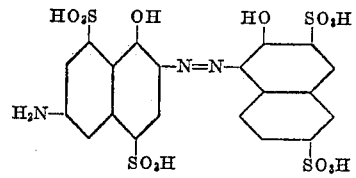

The amino-monoazo dyestuff is then dissolved in a soda-alkaline medium in 700 parts by volume of water and treated with 65 parts by volume of a 10 percent sodium nitrite solution. This mixture is run with stirring at 0–3° C. into 42 parts by volume of hydrochloric acid ($d=1.14$). When the diazotizing is completed, the product is rapidly filtered off with suction, the diazonium salt stirred in 100 parts by volume of water and 50 parts by weight of ice and combined at 0–3° C. with a solution of 13 parts by weight of 1-amino-2-methoxy-5-methylbenzene in 100 parts by volume of water and 15 parts by volume of hydrochloric acid ($d=1.14$). To the coupling solution there are added 100 parts by volume of a 20 percent sodium acetate solution and after termination of the coupling the reaction product is isolated by rendering the mixture acid to Congo. The compound thus obtained of the probable formula

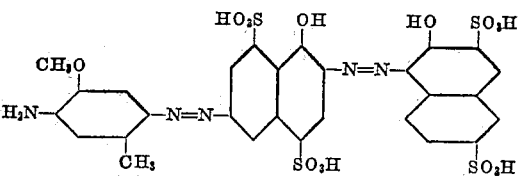

is dissolved soda-alkaline in 800 parts by volume of water, treated with 62 parts by volume of a 10 percent sodium nitrite solution and added at 0° C. with stirring to 42 parts by volume of 28 percent hydrochloric acid. When the diazotizing is completed, the solution is combined at 0° C. with a solution of 28 parts by weight of the sodium salt of 2-hydroxynaphthalene-3,6-disulfonic acid in 300 parts by volume of water and 200 parts by volume of a 20 percent sodium carbonate solution. The dyestuff thus obtained is separated with sodium chloride, isolated and after-treated with copper salts in usual manner.

Thus the copper complex of the trisazo dyestuff of the formula

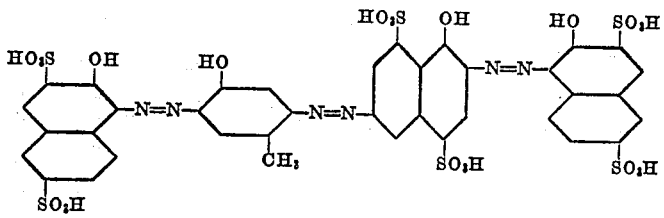

is obtained which, after drying, is a dark powder which dissolves in water with a blue coloration and dyes cotton in a greyish blue shade of good fastness properties.

The same dyestuff is obtainable by first coppering in usual manner the reduced product of the monoazo dyestuff coppered by oxidation (formula, column 4, lines 6–14) by subsequently diazotizing in an acetic acid medium and coupling, further diazotizing in an acetic acid medium, coupling again and, finally, coppering with de-methylation.

When using instead of 2-hydroxynaphthalene-3,6-disulfonic acid the equivalent amount of 2-hydroxynaphthalene-5-sulfonic acid as an initial coupling component, or when replacing the middle component 1-amino-2-methoxy-5-methylbenzene by the equivalent amount of 1-amino-2-methoxybenzene and using 2-hydroxynaphthalene-5-sulfonic acid instead of 2-hydroxynaphthalene-3,6-disulfonic acid as an initial coupling component, greyish blue dyestuffs for cotton are obtained.

Example 2

When replacing in Example 1 the end component 2-hydroxynaphthalene-3,6-disulfonic acid by the equivalent amount of 1-hydroxynaphthalene-3,6-disulfonic acid and otherwise proceeding in a similar manner to that described in Example 1, a copper-containing dyestuff is obtained which, after drying, is a dark powder which dissolves in water with a blue coloration and dyes cotton in a greyish blue shade.

Example 3

When using as an end component in Example 1 instead of 2-hydroxynaphthalene-3,6-disulfonic acid, the equivalent amount of 1-hydroxynaphthalene-3,8-disulfonic acid, a dyestuff is obtained which is similar to that of Example 2 and dyes cotton in greyish blue shades.

Example 4

When replacing in Example 1 the end component 2-hydroxynaphthalene-3,6-disulfonic acid by the equivalent amount of 1-(4',8'-disulfonaphthyl-[2'])-3-methyl-5-pyrazolone, and otherwise proceeding in the same maner as described in that example, a dyestuff is obtained which dyes cotton in grey shades.

Example 5

According to the process described in Example 1, 34.8 parts by weight of 2-amino-6-nitronaphthalene-4,8-disulfonic acid are coupled with 30.4 parts by weight of the sodium salt of 2-hydroxynaphthalene-3,6-disulfonic acid, the monoazo dyestuff thus obtained is coppered by oxidation and then reduced to form the amino compound. The amino compound is diazotized as described in Example 1, the diazonium salt is stirred in 150 parts by volume of water, combined at 0° C. with 26 parts by weight of the sodium salt of 1-amino-2-ethoxynaphthalene-6-sulfonic acid which has previously been stirred in 400 parts by volume of water, and treated with 50 parts by volume of a 20 percent sodium acetate solution. After completion of the coupling, the reaction product is salted out with sodium chloride and isolated.

The dyestuff paste thus obtained is dissolved soda-alkaline in 900 parts by volume of water, treated with 70 parts by volume of a 10 percent sodium nitrite solution and added at 0–25° C. with stirring to 42 parts by volume of 28 percent hydrochloric acid. When the diazotizing is completed, the excess nitrous acid is destroyed by means of amidosulfonic acid, and the diazotized mixture is combined at 0° C. with a solution of 30 parts by weight of the sodium salt of 2-hydroxynaphthalene-3,6-disulfonic acid in 300 parts by volume of water and 200 parts by volume of a 20 percent sodium carbonate solution. After completion of the coupling, the dyestuff thus formed is salted out with sodium chloride, isolated and after-treated with copper salts.

A dyestuff is thus obtained which, after drying, is a dark powder which dissolves in water with a blue coloration and dyes cotton in greyish blue shades.

When using instead of 2-hydroxynaphthalene-3,6-disulfonic acid the equivalent amount of 2-hydroxynaphthalene-5-sulfonic acid as an initial coupling component, a dyestuff is obtained which dyes cotton in a greyish blue shade.

When using as an end component instead of 2-hydroxynaphthalene-3,6-disulfonic acid the equivalent amount of 1-hydroxynaphthalene-3,6-disulfonic acid, a similar dyestuff for cotton is obtained.

Example 6

34.8 parts by weight (0.1 mol) of 2-amino-6-nitronaphthalene-4,8-disulfonic acid are diazotized in usual manner, combined with a solution of 13.7 parts by weight of 1-amino-2-methoxy-5-methylbenzene in 14 parts by volume of hydrochloric acid ($d=1.14$) and subsequently with 140 parts by volume of a 20 percent sodium acetate solution. After termination of the coupling, the product is isolated by rendering the mixture acid to Congo, and re-dissolved in an alkaline medium. To the alkaline dyestuff solution there are added 70 parts by volume of a 10 percent sodium nitrite solution, and the solution is diazotized at room temperature by running it into 42 parts by a volume of hydrochloric acid ($d=1.14$) diluted with 50 parts by volume of water. When the diazotizing is completed, a solution of 30.4 parts by weight (0.1 mol) of the sodium salt of 2-hydroxynaphthalene-3,6-disulfonic acid in 300 parts by volume of water is added and coupling is effected at 0° C. in a soda-alkaline medium.

The isolated dyestuff paste is dissolved in about 700 parts by volume of hot water and stirred at 60° C. with a solution of 42 parts by weight of crystallized sodium sulfide in 100 parts by volume of water, until the reduction of the nitro group to the amino group is completed. The amino compound is isolated in usual manner, re-dissolved, the alkaline solution is treated with 70 parts by volume of a 10 percent sodium nitrite solution and diazotized at 0° C. by running into a mixture of 56 parts by volume of hydrochloric acid ($d=1.14$) and 50 parts by volume of water. After completion of the diazotizing, a solution of 30.4 parts by weight of 2-hydroxynaphthalene-3,6-disulfonic acid in 300 parts by volume of water is added, the mixture is coupled in a soda-alkaline medium and isolated.

The paste thus obtained is then coppered in usual manner with oxidation and de-methylation.

The coppered dyestuff dyes cotton in greyish blue shades.

Example 7

34.8 parts by weight of 2-amino-6-nitronaphthalene-4,8-disulfonic acid are diazotized as indicated in Example 1, coupled with 30.4 parts by weight of 2-hydroxynaphthalene-3,6-disulfonic acid and isolated. The paste is dissolved in 1200 parts by volume of water, treated at 0° C. with a solution of 42 parts by weight of crystallized sodium sulfide in 100 parts by volume of water, until the reduction is completed, then filtered and isolated. The amino compound is then dissolved weakly soda-alkaline in about 1400 parts by volume of water, treated with 70 parts by volume of a 10 percent sodium nitrite solution and diazotized at 20° C. by running into 42 parts by volume of hydrochloric acid ($d=1.14$) and 50 parts by volume of water. 13.7 parts by weight of 1-amino-2-methoxy-5-methylbenzene, dissolved with 15 parts of hydrochloric acid and water, are added after the completion of the diazotizing, coupling is effected by the addition of a sodium acetate solution and the product is then isolated. The re-dissolved paste is dissolved weakly soda-alkaline in 1500 parts by volume of water, treated with 70 parts by volume of a 10 percent sodium nitrite solution and diazotized by running into 50 parts by volume of hydrochloric acid and water. After completion of the diazotizing, 30.4 parts by weight of 2-hydroxynaphthalene-3,6-disulfonic acid in 300 parts by volume of water are added and coupling is effected in a soda-alkaline medium. After the usual intermediary isolation, the dyestuff is coppered by usual methods with oxidation and de-methylation. A dark powder is thus obtained which dyes cotton greyish blue.

Example 8

34.8 parts by weight (0.1 mol) of 2-amino-6-nitronaphthalene-4,8-disulfonic acid are coupled with 13.7 parts by weight of 1-amino-2-methoxy-5-methylbenzene and isolated as described in Example 6.

To the neutral dyestuff solution there is added a solution of 42 parts by weight of crystallized sodium sulfide in 100 parts by volume of water, the product is reduced at 60° C. and isolated.

The redissolved dyestuff paste is dissolved weakly soda-alkaline in 1000 parts by volume of water, treated with 140 parts by volume of a 10 percent sodium nitrite solution and tetrazotized at 0° C. by running into 100 parts by volume of hydrochloric acid ($d=1.14$) and 100 parts by volume of water. After completion of the tetrazotizing, there is added a solution of 60.8 parts by weight of 2-hydroxynaphthalene-3,6-disulfonic acid in 600 parts by volume of water and coupling is effected in a soda-alkaline medium.

The dyestuff thus obtained is separated with sodium chloride, isolated and redissolved. It is then coppered with oxidation and de-methylation by the usual known methods.

A dyestuff is thus obtained which dyes cotton in greyish blue shades.

*Example 9*

From 15.2 parts by weight (0.05 mol) of 2-hydroxynaphthalene-3,6-disulfonic acid and 17.4 parts by weight (0.05 mol) of 2-amino-6-nitronaphthalene-4,8-disulfonic acid there is prepared by coupling and oxidizing coppering according to the instructions of Example 1 the copper-containing nitromonoazo dyestuff (I)

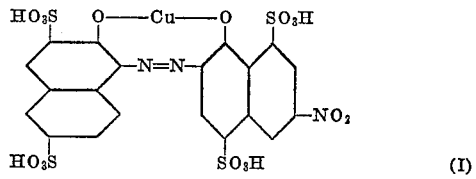

(I)

From 7.7 parts by weight (0.05 mol) of 5-nitro-2-amino-1-hydroxybenzene and 15.2 parts by weight of 2-hydroxynaphthalene-3,6-disulfonic acid there is obtained by the usual diazotizing, coupling and coppering a second copper complex compound (II)

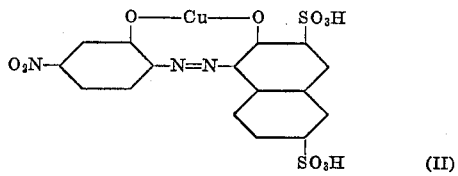

(II)

The copper complex compounds of the two monoazo dyestuffs are thoroughly stirred in 700 parts by volume of water, treated with 14 parts by weight of glucose dissolved in 70 parts by volume of water, and with 60 parts by volume of a 40 percent sodium hydroxide solution slowly heated to about 60° C. and kept at this temperature, until the reaction is completed. The dyestuff thus obtained is separated with sodium chloride and isolated and if desired, after-treated with copper salts. The isolated and dried dyestuff is a dark powder which dissolved in water with a blue coloration and dyes cotton in greyish blue shades.

When using for the manufacture of the copper complex compound (II) instead of 2-hydroxynaphthalene-3,6-disulfonic acid the equivalent amount of 1-hydroxynaphthalene-3,6- or -3,8-disulfonic acid or 1(4′,8′-disulfonaphthyl-[2′]-)-3-methyl-5-pyrazolone as a coupling component, dyestuffs are obtained which yield on cotton blue to greyish blue shades.

When replacing the azo component 2-hydroxynaphthalene-3,6-disulfonic acid of the copper complex compound (I) by the equivalent amount of 1-hydroxynaphthalene-4-sulfonic acid, and using the second copper complex (II) as the second nitro component, a dyestuff is obtained which dyes cotton in a blue shade.

We claim:

1. A copper-containing polyazo dyestuff corresponding to the formula

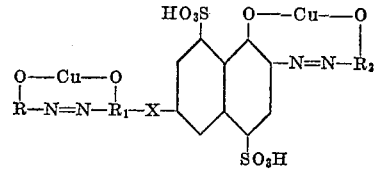

wherein R and $R_2$ stand for radicals of a coupling component selected from the group consisting of the benzene, naphthalene and pyrazolone series bearing the complex-linked oxygen atom in o-position to the azo bridge, $R_1$ stands for an aromatic radical selected from the group consisting of the benzene and naphthalene series containing the azo bridge and the radical X in p-position to one another and the complex-linked oxygen atom in o-position to the final azo bridge, and X means a radical selected from the group consisting of

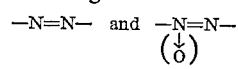

2. The copper containing polyazo dyestuff corresponding to the formula

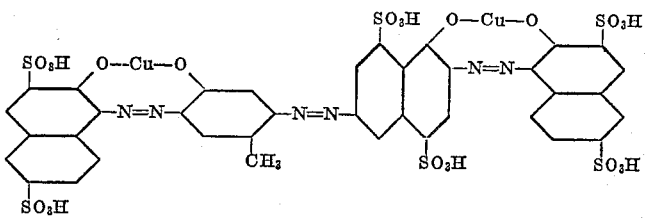

References Cited in the file of this patent

UNITED STATES PATENTS

| | | |
|---|---|---|
| 1,788,797 | Jordan | Jan. 13, 1931 |
| 2,259,736 | Crossley | Oct. 21, 1941 |